US 6,533,110 B1

(12) United States Patent
Ledingham

(10) Patent No.: US 6,533,110 B1
(45) Date of Patent: *Mar. 18, 2003

(54) GUIDE RAIL SPACER

(75) Inventor: Stuart J. Ledingham, Coto de Caza, CA (US)

(73) Assignee: Valu Engineering, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/696,746

(22) Filed: Oct. 24, 2000

Related U.S. Application Data

(63) Continuation of application No. 09/173,661, filed on Oct. 15, 1998, now Pat. No. 6,135,271.

(51) Int. Cl.[7] ............................................. B65G 21/02
(52) U.S. Cl. .............................. 198/861.1; 198/836.1; 198/836.3
(58) Field of Search .................. 198/861.1, 836.1, 198/836.3, 836.4, 840

(56) References Cited

U.S. PATENT DOCUMENTS

| | | | | | |
|---|---|---|---|---|---|
| 229,670 A | * | 7/1880 | Carrick | .................... | 198/836.3 |
| 930,870 A | * | 8/1909 | Lewis | ..................... | 198/836.3 |
| 3,059,589 A | * | 10/1962 | Schreyer | .................... | 104/111 |
| 3,280,962 A | * | 10/1966 | Stone et al. | ................ | 198/204 |
| 3,554,353 A | * | 1/1971 | Raudat | .................... | 198/836.3 |
| 3,647,051 A | * | 3/1972 | Didas | ........................ | 198/204 |
| 3,776,350 A | * | 12/1973 | Tice | ............................ | 198/204 |
| 3,800,938 A | * | 4/1974 | Stone | ........................ | 198/204 |
| 4,225,035 A | * | 9/1980 | Mohney et al. | ............. | 198/836 |
| 4,470,499 A | * | 9/1984 | Sibrandij | .................... | 198/836 |
| 4,502,594 A | * | 3/1985 | Sijbrandij | ................... | 198/836 |
| 5,322,160 A | * | 6/1994 | Markiewicz et al. | ...... | 198/836.3 |
| 5,492,218 A | * | 2/1996 | Falkowski | ............... | 198/836.3 |
| 5,626,221 A | * | 5/1997 | Ledingham | ............. | 198/836.3 |
| 5,782,339 A | * | 7/1998 | Drewitz | ................... | 198/836.3 |
| 5,819,911 A | * | 10/1998 | Ledingham | ............. | 198/836.3 |
| 5,927,480 A | * | 7/1999 | McCaffrey et al. | ....... | 198/836.3 |
| 5,967,259 A | * | 10/1999 | Williams | .................... | 182/129 |
| 5,967,295 A | | 10/1999 | Ledingham | | |
| 6,003,662 A | * | 12/1999 | McCaffrey et al. | ....... | 198/836.3 |
| 6,135,271 A | * | 10/2000 | Ledingham | ............. | 198/836.3 |

FOREIGN PATENT DOCUMENTS

| | | |
|---|---|---|
| CH | 335905 | 3/1959 |
| GB | 489838 | 8/1938 |

OTHER PUBLICATIONS

Valu Guide® brochure pp. 10.4A and 10.4B (1994).
Valu Engineering, Inc. brochure p. 10 and back cover page showing SnapLock™ Clips and Spacers (1995).

\* cited by examiner

*Primary Examiner*—Christopher P. Ellis
*Assistant Examiner*—Rashmi Sharma
(74) *Attorney, Agent, or Firm*—Knobbe, Martens, Olson & Bear, LLP

(57) ABSTRACT

A guide rail spacer is provided that can be adjusted among a plurality of predetermined fixed positions with respect to the guide rail which it supports. The spacer can also be secured when not in use such that it does not interfere with conveyor line operations while remaining readily available for use.

20 Claims, 3 Drawing Sheets

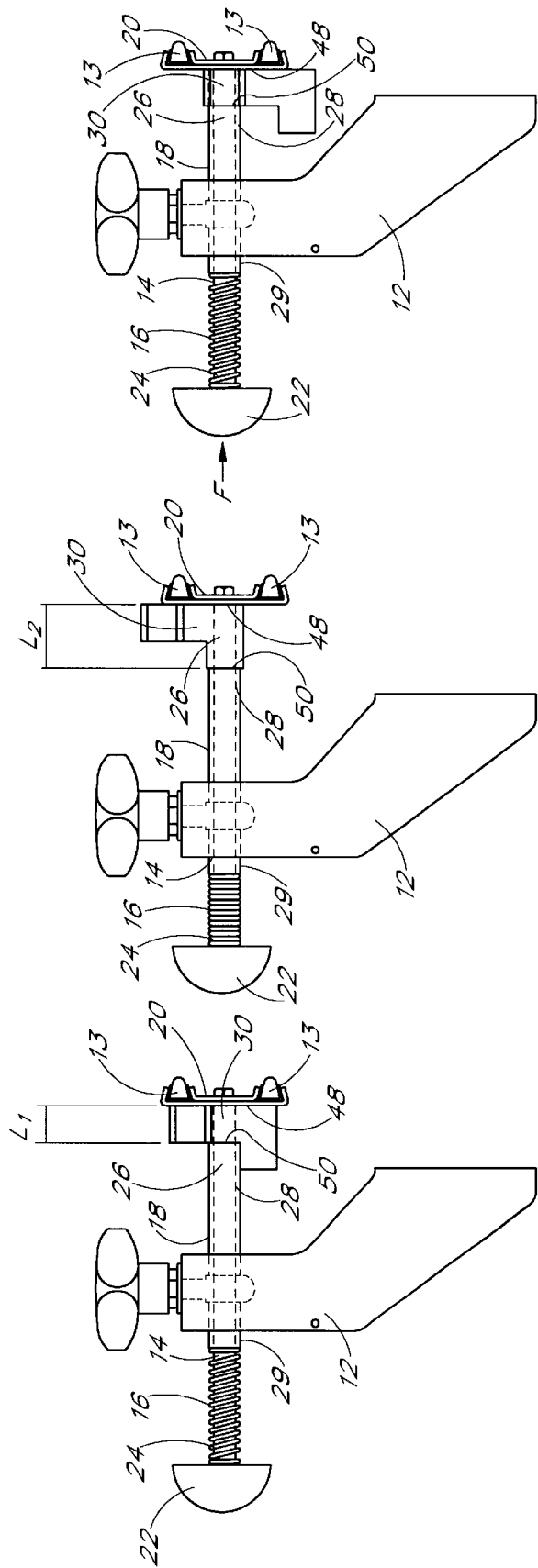

GUIDE RAIL SPACER

RELATED APPLICATION

This application is a continuation of application Ser. No. 09/173,661, filed Oct. 15, 1998, now U.S. Pat. No. 6,135,271.

BACKGROUND OF THE INVENTION

1. Field of the Invention

The present invention relates in general to guide rail spacers for use with guide rail assemblies used in assembly line and conveyor belt systems and, in particular, to an improved means for providing variable adjustment and positioning of a guide rail.

2. Description of the Related Art

Guide rails are used to direct the travel of articles along a predetermined path of an assembly line or conveyor system. The articles are conveyed in a belt or track during the processing and packaging procedures of a typical manufacturer. Dependable support and adjustment of the guide rails is important to ensure manufacturing efficiency and to prevent the articles from tipping over or falling off the conveyor system.

Typically, whenever a different article travels through the conveyor system, the guide rails must be adjusted to accommodate the specifications of that article. This entails adjusting the guide rails to certain vertical and horizontal distances from the conveyor system. Although previous guide rail support posts allowed for this adjustment procedure, they did not allow this procedure to be readily repeatable. That is, each time a different article was conveyed, the vertical and horizontal distance calibrations had to be performed anew. Depending on the complexity of the adjustments, this procedure could require significant amounts of time and cause unnecessary manufacturing downtime. This nonrepeatability problem has been addressed by U.S. Pat. No. 5,819,911 issued to Ledingham. This patent discloses a railing support post that can be adjusted with respect to the guide rail which it supports.

A spacer is typically used to adjust among predetermined fixed positions with respect to the guide rail which it supports. However, prior art spacer designs have significant shortcomings. For example, although the prior art spacer designs disclose a two-position spacer, the spacer dangles freely from a lanyard proximal the guide rails, when neither position is used. Although this arrangement allows the spacer to be readily available for use, it can nevertheless inadvertently become tangled with or otherwise interfere with conveyor line operations.

A need therefore exists for a guide rail spacer that can be adjusted among a plurality of predetermined fixed positions with respect to a guide rail supported by a guide rail support post. A need also exists for a spacer that can be secured when not in use such that it does not interfere with conveyor line operations while remaining readily available for use.

SUMMARY OF THE INVENTION

In accordance with the present invention, a guide rail spacer is provided that can be adjusted among a plurality of predetermined fixed positions with respect to the guide rail which it supports. The spacer can also be secured when not in use such that it does not interfere with conveyor line operations while remaining readily available for use.

A further advantage of the present invention is that multi-functioning spacers may be mounted along a portion of the guide rail support to provide adjustment of a guide rail among predetermined fixed positions. Individual spacers maintain a plurality of mounting positions which allow one spacer to function as the equivalent of several spacers. The spacer is also constructed so that it does not interfere with conveyor line operations when not is use, but remains readily available for use. The spacer may also include a handle section for easy insertion and removal.

In accordance with one aspect of the present invention, the spacer has a body defining a plurality of channels with the plurality of channels including a first channel interposed between a second channel and a third channel. The first channel and second channels sized and configured to accept the tube, and the third channel sized and configured to accept the housing element.

Further aspects, features and advantages of the present invention will become apparent from the detailed description of the preferred embodiment that follows.

BRIEF DESCRIPTION OF THE DRAWINGS

The above-mentioned and other features of the invention will now be described with reference to the drawings of a preferred embodiment of the present guide rail spacer. The illustrated embodiment of the guide rail spacer is intended to illustrate, but not to limit the invention. The drawings contain the following figures:

FIG. 3A is a side elevation view of the guide rail support post of FIG. 1, illustrating the spacer in a first position;

FIG. 3B is a side elevation view of the guide rail support post of FIG. 1, illustrating the spacer in a second position; and FIG. 3C is a side elevation view of the guide rail support post of FIG. 1, illustrating the spacer in a home position.

DETAILED DESCRIPTION OF THE PREFERRED EMBODIMENT

Figure 1:
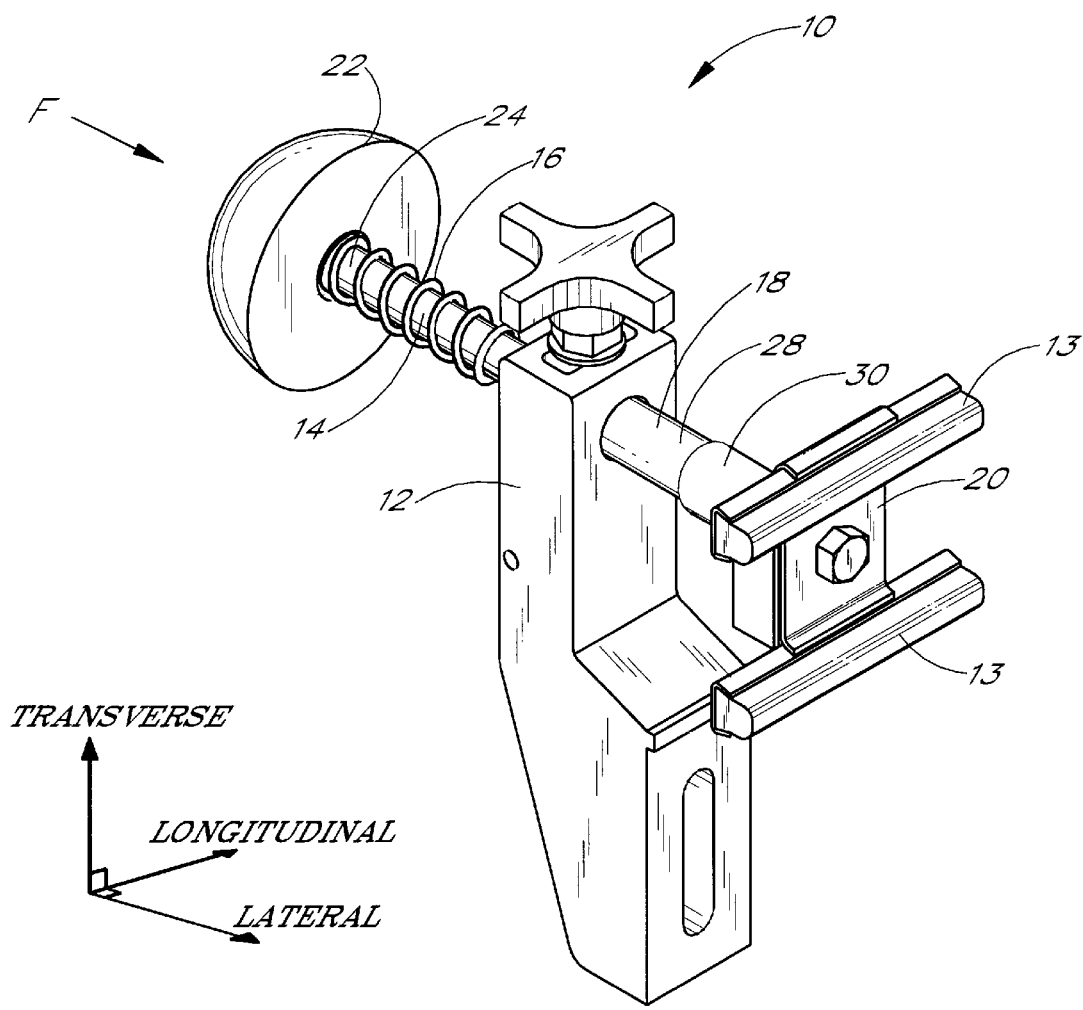
FIG. 1 is a perspective view of a flexible guide rail support post supporting a pair of guide rails and having a spacer inserted in a first position in accordance with the teachings of the invention.

The present embodiment of the guide rail spacer is disclosed in the context of an exemplary guide rail support post to support one or more guide rails on a conveyor assembly. The principles of the present invention, however, are not limited to use with guide rail support posts or even conveyor assemblies for that matter. Instead, it will be understood by one skilled in the art, in light of the present disclosure, that the guide rail spacer disclosed herein can also be successfully utilized in a variety of other contexts.

To assist in the description of the components of the illustrated embodiment, the following coordinate terms are used. A "longitudinal axis" is generally parallel to the ends 48,50 of the spacer 30 when mounted on the guide rail support post 10. A "lateral axis" is normal to the longitudinal axis and is generally parallel to the plane of the supported guide rails 13,14. A "transverse axis" extends normal to both the longitudinal and lateral axes and along the vertical height of the support bar 2. In addition, as used herein, the "longitudinal direction" refers to a direction substantially parallel to the longitudinal axis; the "transverse direction" refers to a direction substantially parallel to the transverse axis; and the "lateral direction" refers to a direction substantially parallel to the lateral axis. Also, the terms "proximal" and "distal" are used consistently with the description of the exemplary application and in reference the guide rails 13,14, proximal being closer to the guide rails 13,14 and distal being farther from the guide rails 13,14.

Referring to the drawings, and particularly to FIG. 1, an exemplary guide rail support post 10 is comprised of a support bar 12, a removable tube 14, an exterior spring 16, a housing element 18, and a clamping means 20. The cylindrical exterior spring 16 and cylindrical housing element 18 abut each other and encase the cylindrical tube 14 to form a working member. The working member is secured and positioned by the support bar 12.

A handle 22 is affixed to a distal end 24 of the tube 14 and the clamping device 20 is affixed to a proximal end 26 of the tube 14 (best seen by FIGS. 3A–C). Application of a linear force onto the handle 22 advances the proximal end 26 of the tube 14 beyond the proximal end 28 of the housing element 18 (best seen by FIGS. 3A–C) and compresses the spring 16. When the linear force is removed, the spring force returns the tube 14 to a resting position. A spacer 30 may then be mounted onto the exposed proximal end 26 of the tube 2 , thereby adjusting the support post 10 in a fixed position. In this manner, one or more spacers 30 may be added or removed to allow adjustment among a variety of fixed positions. A more detailed description of the structure, assembly and operation of the guide rail support post 10 is provided in U.S. Pat. No. 5,819,911 issued to Ledingham and hereby incorporated by reference.

Figure 2:
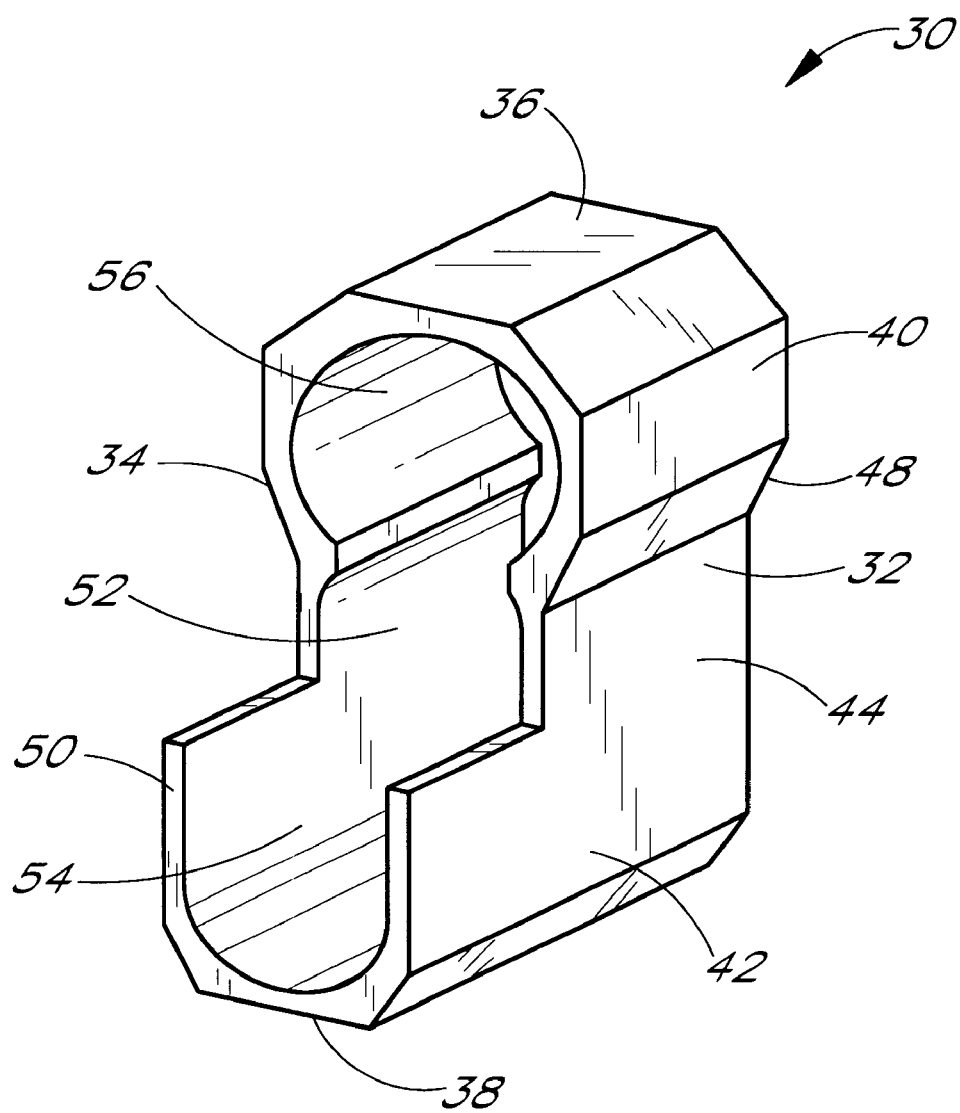
FIG. 2 is a perspective view of the spacer of FIG. 1.

Referring to FIG. 2, the support post incorporates a spacer 30 that can be mounted onto the proximal end 26 of the tube 14. The spacer 30 is constructed in a generally L-shaped design and has a first side 32 and a second side 34, both sides 32,34 extending in the longitudinal and transverse directions. The first side 32 communicates with the second side 34 through an upper bridge 36 and a lower bridge 38, both bridges 36,38 extending in the lateral direction. The upper bridge 38 bounds an upper portion 40 of the spacer 30 and the lower bridge 38 bounds a lower portion 42 of the spacer 30. The upper and lower portions 40,42 of the spacer 30 communicate through a middle portion 44 which is formed therebetween. The spacer 30 also has a proximal end 48 and a distal end 50 that each extend in the transverse direction, the proximal and distal ends 48,50 are open or exposed.

The upper portion 40 of the spacer 30 has a longitudinal length that is approximately equal to the longitudinal length of the middle portion 44 of the spacer 30. The lower portion 42 of the spacer 30 has a longitudinal length that is approximately twice the longitudinal length of the longitudinal length of the upper and middle portions 48,44.

The lower portion 42 of the spacer 30 has a lateral length that is approximately equal to the lateral length of the middle portion 44 of the spacer 30. The upper portion 40 of the spacer 30 has a lateral length that is preferably 1.1 to 2 times longer, and more preferably approximately 1.3 to 1.5 times longer, than the lateral length of the lower or middle portions 42,44.

The upper portion 40, lower portion 42 and middle portion 44 of the spacer 30 preferably have transverse lengths that are approximately equal.

When so arranged, a first or middle channel 52 is formed between the proximal and distal ends 48,50 of the spacer 30. The middle channel 52 is bounded in the lateral direction by the first and second sides 32,34 of the spacer 30. The middle channel 52 communicates with a lower channel 54 and an upper channel 56 in the transverse direction. The middle channel 52 is sized and configured to accept a portion of the tube 14 but not to accept a portion of the housing element 18.

That is, the tube 14, which has a smaller radius than the radius of the middle channel 52 can pass through the middle channel 52, while the housing element 18, which has a larger radius than the radius of the middle channel 52 cannot pass through the middle channel 52.

A second or lower channel 54 is formed between the proximal and distal ends 48,50 of the spacer 30. The lower channel 54 is bounded in the lateral direction by the first and second sides 32,34 of the spacer 30 and is bounded in the transverse direction by the lower bridge 38, while also communicating with the middle channel 52 in the transverse direction. The lower channel 54 is sized and configured similar to the middle channel 52 such that the lower channel 54 can accept a portion of the tube 14 but not accept a portion of the housing element 18. That is, the tube 14, which has a smaller radius than the radius of the lower channel 54 can pass through the lower channel 54, while the housing element 18, which has a larger radius than the radius of the lower channel 54, cannot pass through the lower channel 54.

A third or upper channel 56 is formed between the proximal and distal ends 48,50 of the spacer 30. The upper channel 56 is bounded in the lateral direction by the first and second sides 32,34 of the spacer 30 and is bounded in the transverse direction by the upper bridge 36 while also communicating with the middle channel 52 in the transverse direction. The upper channel 56 is sized and configured such that the upper channel 56 can accept both a portion of the tube 14 and a portion of the housing element 18. That is, the tube 14, which has a smaller radius than the radius of the upper channel 56 can pass through the upper channel 56, while the housing element 18, which also has a smaller radius than the radius of the upper channel 56 can also pass through the upper channel 56.

The exterior and interior of the spacer 30 can be formed in a variety of geometric configurations. The illustrated embodiment shows the exterior of the lower and middle portions 42,44 of the spacer 30 as being generally linear and smooth, with the first and second sides 32,34 generally parallel in the longitudinal and transverse directions. The exterior of the upper portion 40 has an arcuate curvature, preferably semi-circular, in the transverse direction and is linear in the longitudinal direction. The illustrated embodiment shows the interior dimensions as being generally similar to the exterior dimensions. However, the upper and lower bridges 36,38 form arcuate curvatures which respectively form semi-circular segments within the second and third channels 54,56. The illustrated channels 52,54,56 thus each form a region having a radius and capable of capturing a radial body. The cross-sectional configurations of the channels, however, need not be radial but rather can form a variety of cross-sectional shapes. For example, one or more of the channels can have an interior perimeter with a cross-sectional shape that is square, rectangular, circular, oval, triangular, pentagonal, octagonal and the like. For another example of a modified channel interior, but without limitation, the channels may combine to form a keyway with an aperture defining a home position (detailed below) with the other channels forming a slot extending into the aperture and defining a plurality of positions. As will be recognized, in this configuration, the keyway may advantageously form a bounded region within the body of the spacer 30.

The above-described dimensions of the spacer 30 provide for fixing the proximal end 26 of the tube 14 beyond the proximal end 28 of the housing element 18, thereby permitting adjustment of the guide rails 13,14 to a plurality of positions. Preferably, this fixation comprises mounting the spacer 30 onto the proximal end 26 of the tube 14. When a linear force F is applied to the handle 22, the force advances the tube 14 and compresses the spring 16, the proximal end 26 of the tube 14 is thereby exposed beyond the proximal end 28 of the housing element 18 and capable of receiving a portion of the spacer 30. When the force F is removed, the spring force returns the tube 14 to a resting position which corresponds to a fixed guide rail position. A plurality of spacers 30 may be mounted on the proximal end 26 of the tube 14 to provide additional varied guide rail positions. The spacer 30 is advantageously pre-placed between the clamp 20 and support 12 before the support 12 is connected to the guide rails 13,14 thereby longitudinally capturing the spacer 30 between the assembled clamp 20 and support 12 along the tube 16 and guide element 18.

FIGS. 3A–C illustrate the spacer 30 mounted on either the proximal end 26 of the tube 14 or mounted across the guide element 18. More specifically, FIG. 3A shows the spacer 30 mounted in a first position on the proximal end 26 of the tube 14. FIG. 3B shows the spacer 30 mounted in a second position on the proximal end 26 of the tube 14; and FIG. 3C shows the spacer mounted in a third position over the circumferentially layered guide element 18 and tube 14.

Referring to FIG. 3A, when linear force F is applied to the handle the proximal end 26 of the tube 14 is exposed beyond the proximal end 26 of the housing element 18 and capable of receiving a portion of the spacer 30, as described above. When the middle channel 52 of the spacer 30 is transversely aligned around the tube 14 and the tube 14 subsequently released, the size and configuration of the middle channel 52 is such that the middle channel 52 can accept a portion of the tube 14 but cannot not accept a portion of the guide element 18, as described above. By this arrangement, the proximal end 48 of spacer 30 abuts the clamp 20 and the distal end 50 of the spacer 30 abuts the guide element 18 while a portion of the tube 14 extends within the middle channel 52. This spacer 30 position corresponds to a first position where the spacer 30 extends the guide rail to a first predetermined length L1.

Referring to FIG. 3B, when the spacer 30 is oriented similar to the spacer shown in FIG. 3A and described above, and the lower channel 54 is transversely aligned around the tube 14 and the tube 14 subsequently released, the size and configuration of the lower channel 54 is such that the lower channel 54 can accept a portion of the tube 14 but cannot not accept a portion of the guide element 18, as described above. By this arrangement, the proximal end 48 of spacer 30 abuts the clamp 20 and the distal end 50 of the spacer 30 abuts the guide element 18 while a portion of the tube 14 extends within the lower channel 54. This spacer 30 position corresponds to a second position where the spacer 30 extends the guide rail to a second predetermined length L2.

Referring to FIG. 3C, when the spacer 30 is oriented similar to the spacer 30 shown in FIG. 3A and described above, and the upper channel 56 is transversely aligned with the tube 14 and the tube 14 subsequently released, the size and configuration of the upper channel 56 is such that the upper channel 56 can accept both a portion of the tube 14 and a portion of the guide element 18, as described above. By this arrangement, the guide element 18 and tube 14 both pass entirely through the upper channel 56 of the spacer 30. The proximal ends 26,28 of the tube thus both abut the clamp 20, with a portion of the tube 14 circumferentially layered within a portion of the guide element 18, which, is within the upper channel 56. This spacer 30 position corresponds to a third or home position where the spacer 30 extends the guide rail to a third predetermined length that is coextensive with not using the spacer 30. The spacer 30 can be advantageously rotated 90 degrees to reduce undesired contact with the support post 10 (not shown).

The spacer 30 may also incorporate a handle molded into the upper or lower bridge 36,38. This handle allows easy insertion and removal of the spacer 30.

In the preferred embodiment, the tube 14 is approximately eight inches in length with an exterior radius of slightly less than one half inch. Both the exterior spring 16 and housing elements 18 are approximately four inches in length with an interior radius of slightly more than one half inch. The middle channel 52 of the spacer 30 has a longitudinal length of approximately one-half inch and an inner radius that is slightly larger than the outer radius of the tube 14 and slightly smaller than the outer radius of the guide element 18, a preferably an inner radius of approximately one half inch. The lower channel 50 of the spacer 30 has a longitudinal length of approximately one inch and an inner radius that is slightly larger than the outer radius of the tube 14 and slightly smaller than the outer radius of the guide element 18, a preferably an inner radius of approximately one half inch. The upper channel 56 of the spacer 30 has a longitudinal length of approximately one-half inch and an inner radius that is slightly larger than the outer radius of the guide element 18, a preferably a radius of one-half to three-quarters of an inch.

The illustrated spacer 30 is constructed in a unibody configuration of a rigid molded plastic. Plastic is preferred for its strength and low cost. However, there is no requirement that the spacer 30 be constructed of a unibody design and can be constructed of other materials such as metals, composites and other suitable materials depending on the particular application of the spacer.

The embodiments illustrated and described above are provided merely as examples of the spacer constructed in accordance with the present invention. Other changes and modifications can be made from the embodiments presented herein by those skilled in the art without departure from the spirit and scope of the invention, as defined by the appended claims.

What is claimed is:

1. A spacer for use with an adjustable guide rail support post, the guide rail support post having a tube which is slidably received by a housing element, the spacer comprising:

a body defining a plurality of channels, the plurality of channels including a first channel interposed between a second channel and a third channel, wherein two of the channels are sized and configured to accept the tube, and the remaining channel is sized and configured to accept the housing element.

2. The spacer of claim 1, wherein selective mounting of the spacer on the guide rail support post with a portion of the tube extending within one of the channels provides a plurality of fixed guide rail positions.

3. A spacer as in claim 1, wherein the first and second channels have substantially the same interior size and shape.

4. A spacer as in claim 1, wherein the first, second and third channels are sized and configured to accept the tube.

5. A spacer as in claim 1, wherein the first and second channels are sized and configured so that they cannot accept the housing element.

6. A spacer as in claim 1, wherein the first channel has a length which is approximately equal to a length of the third channel.

7. A spacer as in claim 1, wherein the first channel has a length which is less than a length of the second channel.

8. A spacer element for use in fixing a position of a guide rail clamp connected to an actuating member of a guide rail support post, said spacer comprising a body having first, second, and third channels extending therethrough, each of said channels being adapted to receive said actuating member, and each of said channels being adapted to allow selective positioning of the guide rail clamp in a different position.

9. The spacer of claim 8, wherein said first channel is adapted to place the guide rail clamp in a first position, said second channel is adapted to place the guide rail clamp in a second position, and said third channel is adapted to place the guide rail clamp in a third position, and wherein said first position is closer to the guide rail support post than said second position.

10. The spacer of claim 9, wherein said third position is further from the guide rail support post than said second position.

11. The spacer of claim 10, wherein said first channel and said second channel have substantially equal lengths.

12. A spacer element for use in fixing a position of a guide rail clamp connected to an actuating member of a guide rail support post, said spacer comprising;

a first channel in which said actuating member may be positioned, said first channel having a first length;

a second channel in which said actuating member may be positioned, said second channel having a second length;

a third channel in which said actuating member and a housing in which the actuating member is slidably disposed may be positioned, said third channel having a third length.

13. The spacer element of claim 12, wherein said first length is substantially the same as said third length.

14. The spacer element of claim 12, wherein the housing may not be positioned in the first and second channels.

15. The spacer element of claim 12, wherein the third length is greater than the first and second lengths.

16. A spacer for use in adjusting a guide rail position, said spacer comprising;

a body having a plurality of channels adapted for the selective insertion of at least one member of the group consisting of an actuating member and a guide element;

wherein each of the plurality of channels is adapted to provide a different guide rail position.

17. The spacer of claim 16, wherein the plurality of channels are in mechanical communication with one another whereby a member positioned therein may be moved between the channels without removing the member from the body.

18. The spacer of claim 16, comprising first and second channels each having a first length, and a third channel having a second length, wherein the second length is greater than the first length.

19. The spacer of claim 18, wherein the first and third channels each have a first diameter, and the second channel has a second diameter, wherein the second diameter is greater than the first diameter.

20. The spacer of claim 16, comprising first and second channels each having a first diameter, and a third channel having a second diameter, wherein the second diameter is greater than the first diameter.

* * * * *